United States Patent
Cariello

(10) Patent No.: US 10,896,033 B2
(45) Date of Patent: Jan. 19, 2021

(54) CONFIGURABLE NAND FIRMWARE SEARCH PARAMETERS

(71) Applicant: Micron Technology, Inc., Boise, ID (US)

(72) Inventor: Giuseppe Cariello, Boise, ID (US)

(73) Assignee: Micron Technology, Inc., Boise, ID (US)

(*) Notice: Subject to any disclaimer, the term of this patent is extended or adjusted under 35 U.S.C. 154(b) by 4 days.

(21) Appl. No.: 16/237,044

(22) Filed: Dec. 31, 2018

(65) Prior Publication Data

US 2020/0210586 A1  Jul. 2, 2020

(51) Int. Cl.
| | |
|---|---|
| *G06F 8/61* | (2018.01) |
| *G06F 21/57* | (2013.01) |
| *G11C 11/56* | (2006.01) |
| *G11C 16/10* | (2006.01) |
| *G06F 12/02* | (2006.01) |

(52) U.S. Cl.
CPC ............ *G06F 8/63* (2013.01); *G06F 8/61* (2013.01); *G06F 12/0246* (2013.01); *G06F 21/57* (2013.01); *G06F 21/572* (2013.01); *G11C 11/5628* (2013.01); *G11C 16/10* (2013.01); *G11C 2211/5641* (2013.01)

(58) Field of Classification Search
None
See application file for complete search history.

(56) References Cited

U.S. PATENT DOCUMENTS

| | | | | |
|---|---|---|---|---|
| 9,799,371 | B1* | 10/2017 | Hirashima | G11B 20/1886 |
| 9,836,307 | B2* | 12/2017 | Gupta | G06F 9/4403 |
| 2003/0226006 | A1* | 12/2003 | Ballard | G06F 9/4401 |
| | | | | 713/1 |

* cited by examiner

*Primary Examiner* — Wynuel S Aquino
*Assistant Examiner* — Mark A Gooray
(74) *Attorney, Agent, or Firm* — Schwegman Lundberg & Woessner, P.A.

(57) ABSTRACT

Disclosed in some examples are memory devices which include electrically programmable elements that specify values for one or more firmware search parameters for use by the bootloader in locating and reading the firmware object. The values of the firmware search parameters may be dynamically selected at manufacturing time by modifying the configuration of the electrically programmable elements by applying or not applying a specified voltage to the electrically programmable elements. In some examples, an electrically programmable element may include: a fuse, an anti-fuse, and/or an e-fuse.

20 Claims, 9 Drawing Sheets

CONFIGURABLE NAND FIRMWARE SEARCH PARAMETERS

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
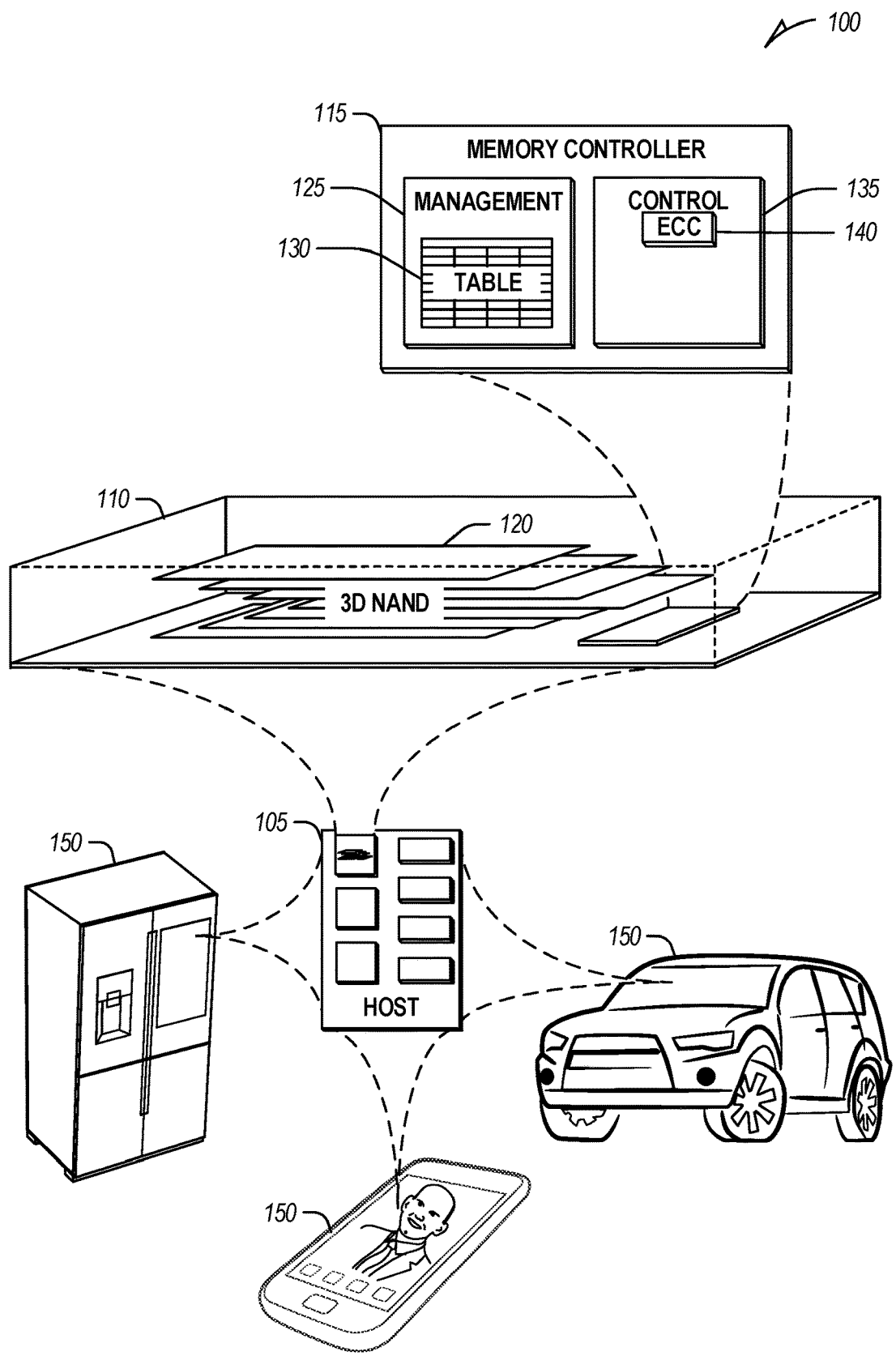
FIG. 1 illustrates an example of an environment including a memory device.

As will be explained more fully below, a memory device may include a controller comprising a processor and working memory. The processor may be communicatively coupled to the working memory. The working memory may include a Read Only Memory (ROM) and a Random-Access Memory (RAM). Upon power up of the memory device, the processor is configured to execute an instruction at a defined address in ROM. A piece of software code referred to herein as a bootloader is flashed into ROM at this address during manufacturing. The bootloader is configured to initialize the controller which includes loading software called firmware into the working memory (e.g., in Random Access Memory (RAM)) and causing execution of the firmware by the processor. Firmware is a collection of operating instructions that cause the controller to perform operations associated with the memory device such as reading from and writing to the NAND device.

If the firmware object is in the same location on each NAND device the task of finding the firmware is fairly straightforward. For reliability and functionality reasons (e.g. retention, read disturbs, update failures etc. . . . ) managed memory devices have multiple copies of the firmware so the search algorithm may need to search for it in different locations. Moreover, modern NAND devices utilize the same controller on many different NAND memory devices with different geometries and configurations and thus different possible firmware locations. Even further, manufacturing defects may cause the locations to be different on different die of the same product. All these differences cause the bootloader to utilize more complicated strategies to find the firmware object. This may increase the size and complexity of the bootloader; may result in decreased chances of actually finding the firmware object; and/or increase the search time for the firmware object thus increasing boot up time. Other strategies to deal with this may include custom bootloaders for each memory device. This may increase controller cost, to implement part of the ROM as non-volatile memory, and manufacturing difficulty as a bootloader would need to be flashed to ROM during manufacturing.

Disclosed in some examples are memory devices which include electrically programmable elements that specify values for one or more firmware search parameters for use by the bootloader in locating and reading the firmware object. The values of the firmware search parameters may be dynamically selected at manufacturing time by modifying the configuration of the electrically programmable elements by applying or not applying a specified voltage to the electrically programmable elements. In some examples, an electrically programmable element may include: a fuse, an anti-fuse, and/or an e-fuse.

For example, the electrically programmable elements may comprise fuses that may be blown or not blown during manufacturing by applying a determined voltage to an input of the fuse. By blowing or not blowing the fuse the electrically programmable elements may be reconfigured such that an input voltage to the fuse may be either inhibited (if the fuse is blown) or passed through (if the fuse is not). One or more fuses may correspond to a single firmware search parameter. As an example, if two fuses correspond to a first search parameter, and one fuse is blown and the second is not, then the electrically programmable elements provide a signal of 1-0 to the processor. The processor may then translate this signal to a value for the first firmware search parameter.

By providing the ability to customize the search parameters quickly and easily during manufacturing, the boatloader can determine information allowing it to quickly and accurately find the firmware regardless of the type of device. This avoids problems of previous solutions that utilized custom bootloaders by providing a standardized bootloader that can be loaded on ROM when the controller is manufactured and does not need to be loaded during memory device manufacturing. The standardized bootloader is customized by selecting different values for the firmware search parameters provided by the electrically programmable elements. This keeps manufacturing simple because custom bootloaders need not be loaded—instead a quick application of electric charge to selected electrically programmable elements may be utilized which is faster and more cost effective.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die, one or more NAND dies, or the like). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMCT™ interface, or one or more other connectors or interfaces. The host device 105 can include a host system, an electronic device, a processor, a memory card reader, or one or more other electronic devices external to the memory device 110. In some examples, the host device 105 can be a machine having some portion, or all, of the components discussed in reference to the machine 900 of FIG. 9.

The memory controller 115 can be on one or more separate integrated circuits from the memory array 120 or can be on a same integrated circuit. In some examples, the functions of memory controller 115 can be divided across multiple integrated circuits. For example, some functionality can be on a separate integrated circuit and some functionality can be part of a controller on each memory die of the memory array 120. Memory controller 115 can receive instructions from the host device 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host device 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

In some examples, the memory array can comprise a number of NAND dies and one or more functions of the memory controller 115 for a particular NAND die can be implemented on an on-die controller on that particular die.

Other organizations and delineations of control functionality can also be utilized, such as a controller for each die, plane, superblock, block, page, and the like.

The memory array 120 can include several memory cells arranged in, for example, a number of devices, semi-conductor dies, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
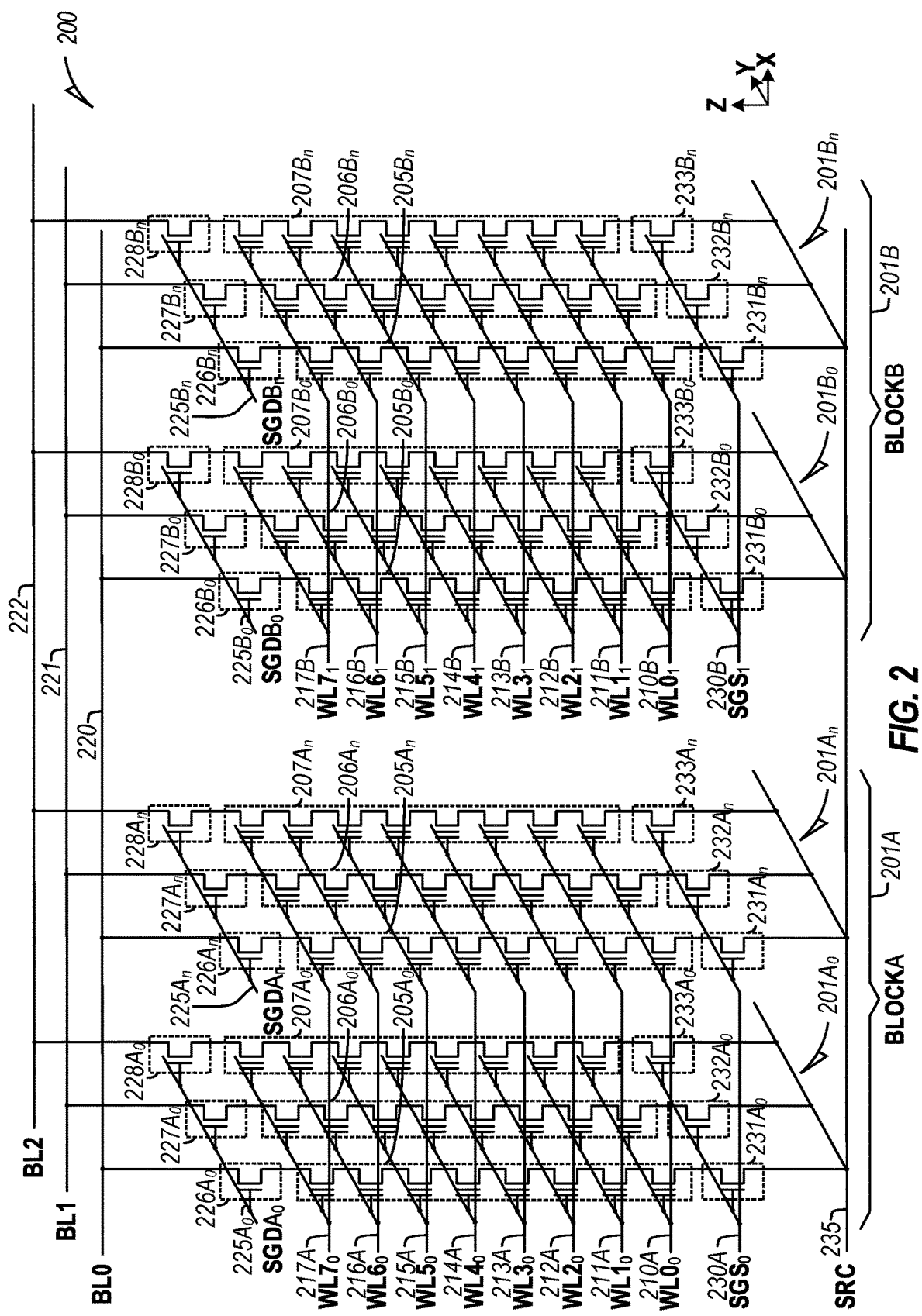
FIGS. 2-3 illustrate schematic diagrams of an example of a 3D NAND architecture semiconductor memory array.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
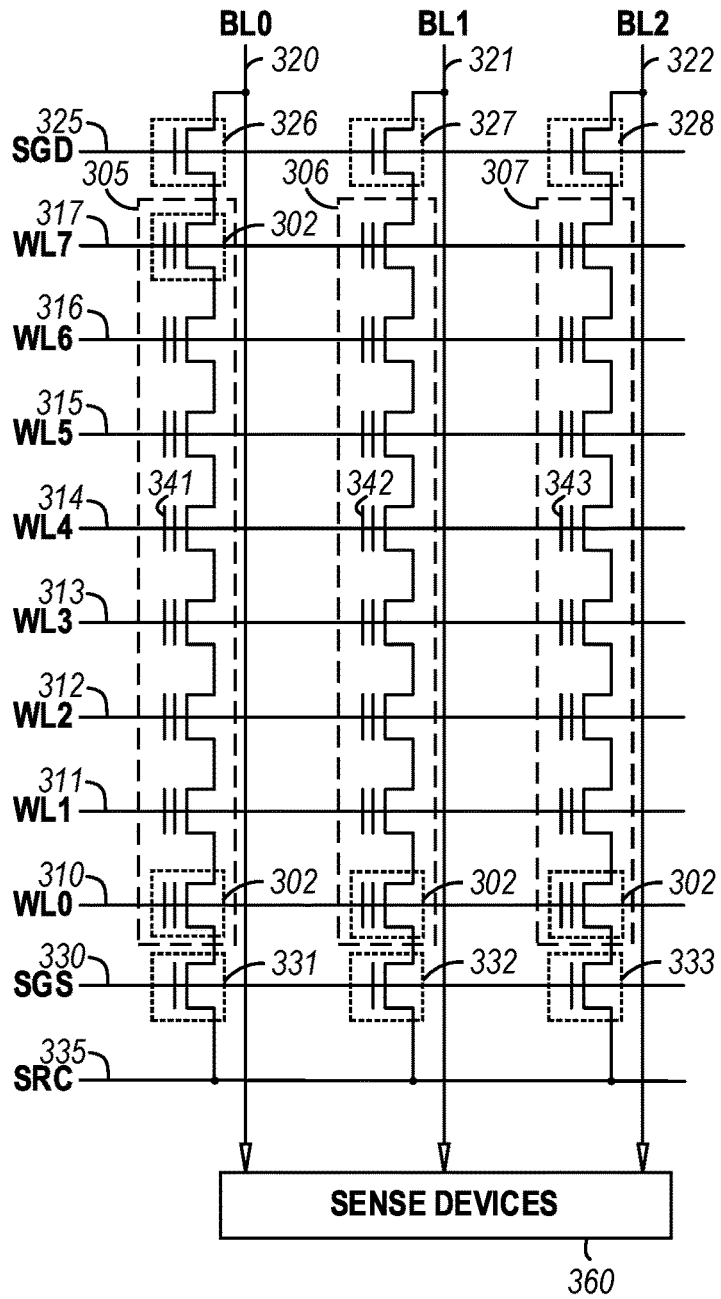

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
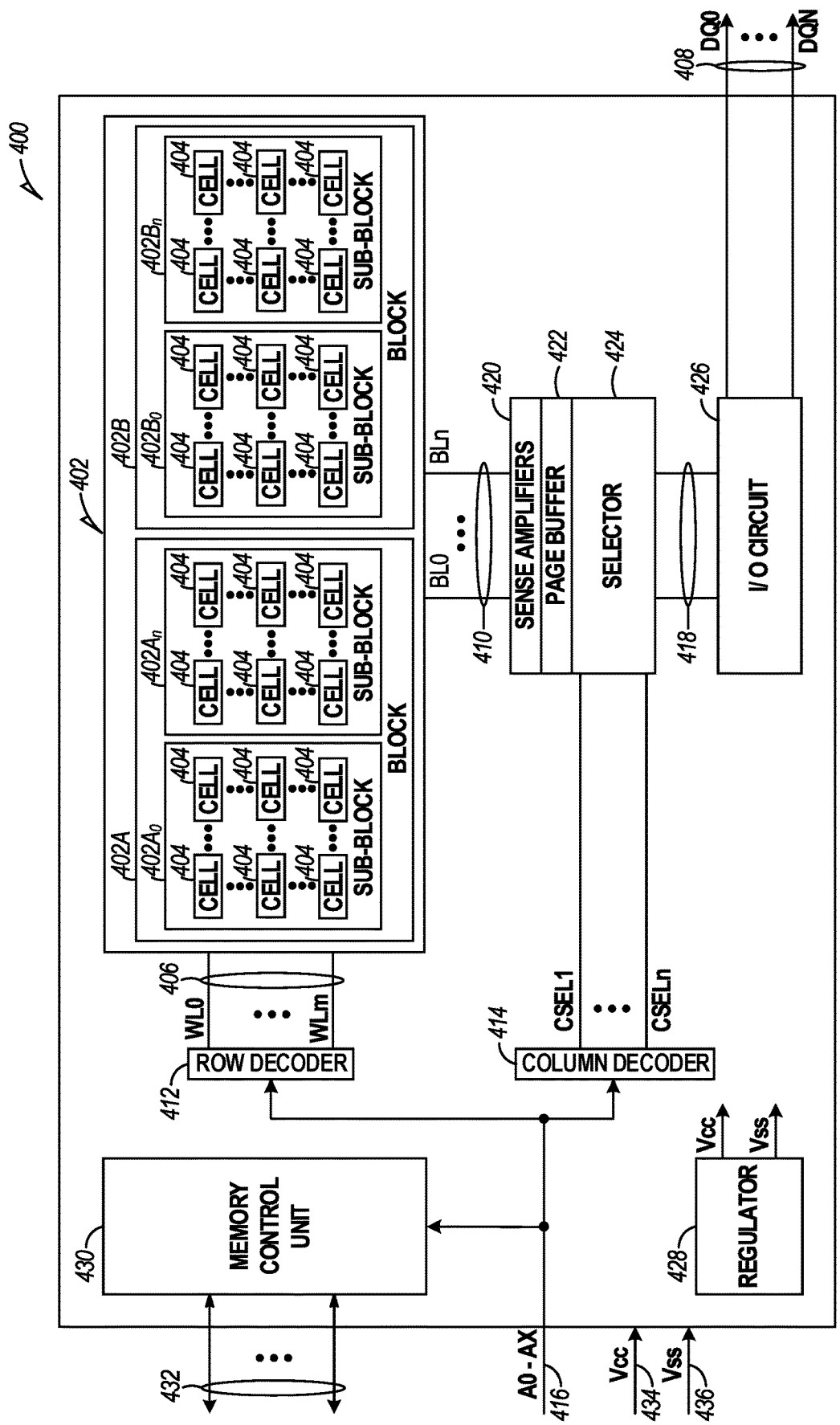
FIG. 4 illustrates an example block diagram of a memory module.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the input/output (I/O) circuit 426 using second data lines 418. In some examples a flash translation layer (not shown) can map addresses provided by a host to physical memory addresses used by the row decoder 412 and column decoder 414 to read data in the memory array 402.

The memory control unit 430 can receive positive and negative supply signals, such as a supply voltage (Vcc) 434 and a negative supply voltage (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

As previously described, a controller may be initialized by a software object called a bootloader. Part of this initialization may include loading and executing one or more firmware objects. In some examples, one firmware object may load a second firmware object, and so on. These firmware objects may be quickly located by the bootloader or other firmware object through the assistance of values of firmware search parameters that are programmed into the device by configuring one or more electrically programmable elements (e.g., during manufacturing). During operation of the memory device, the one or more electrically programmable elements may receive an input signal and produce an output signal that is input to a microprocessor of the controller. The output signal for a given input may depend upon the configuration of the electrically programmable elements. The signal is then read by the bootloader executing on the microprocessor and converted into values for firmware search parameters.

The configuration of the electrically programmable elements may be changed during manufacturing by application of an electric signal above a voltage or current threshold to the electrically programmable elements. For example, if the electrically programmable elements comprise an e-fuse, the electrically programmable elements may be reconfigured by blowing one or more e-fuses. Blowing an e-fuse changes the output signal that is fed to the microprocessor of the controller in response to an input signal to the electrically programmable elements.

As noted, output signals of the electrically programmable elements may select each of one or more values for one or more firmware search parameters and the output may be changed by reconfiguring the electrically programmable elements. For example, if all of the electrically programmable elements default to carrying a signal (e.g., they all register "high") when a signal is applied to the electrically programmable elements, then by applying an electrical signal that is over a threshold voltage or current to one of the electrically programmable elements, the fuse may blow and the signal may no longer travel through to the microprocessor and that signal goes low. By using a number of electrically programmable elements and by application of electricity above the threshold current or voltage to select ones of the electrically programmable elements, the manufacturer may specify one or more values for one or more firmware search parameters. For example, if two electrically programmable elements are used, in an initial state, each may output a high signal. By application of electrical power above a threshold voltage or current, one or both may be altered to a second state that outputs a low signal (e.g., the fuse blows and stops conducting an input signal to the output). Thus, if two electrically programmable elements are mapped to a particular firmware search parameter, this offers up to 4 possible values which may be selected.

Figure 5:
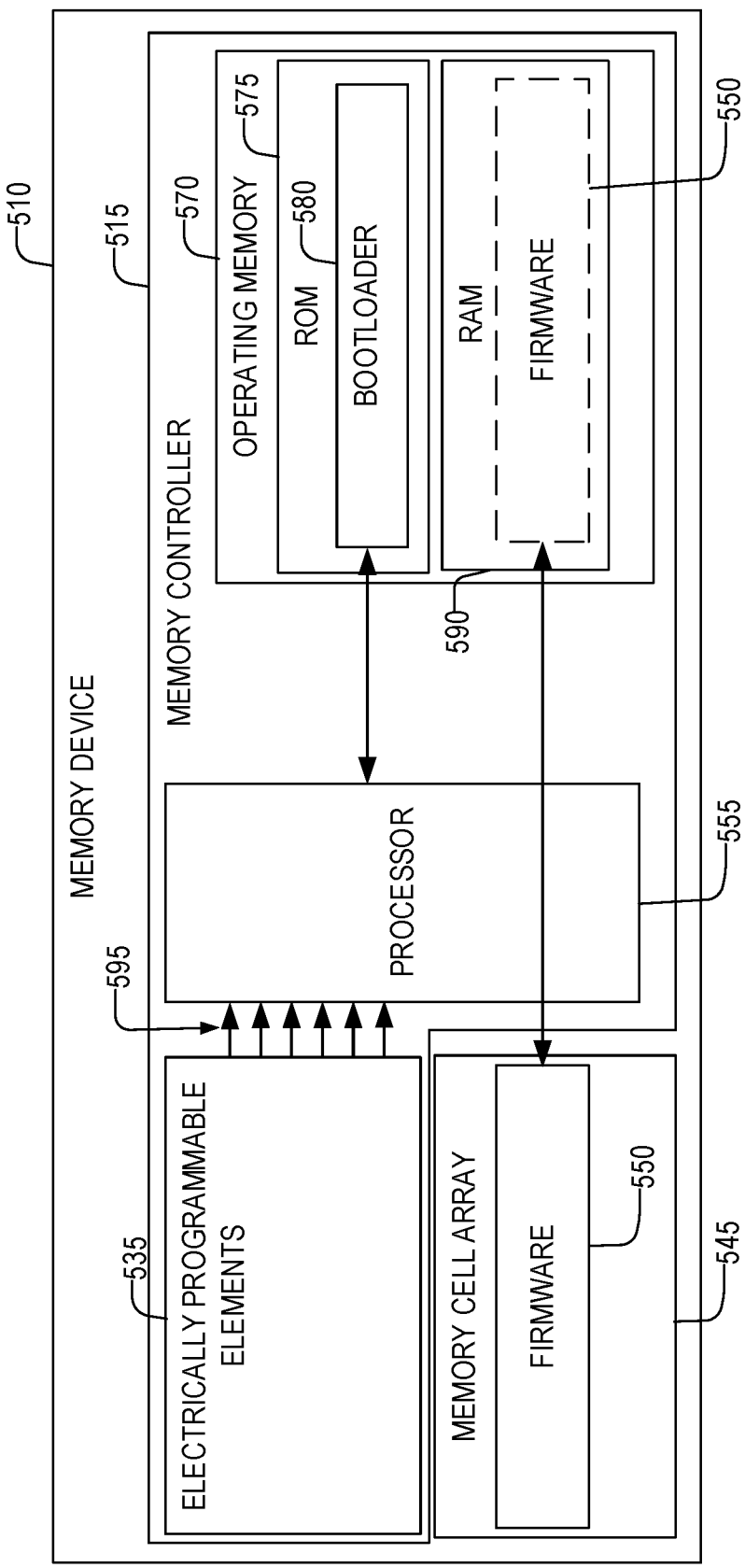
FIG. 5 illustrates a block diagram of an example memory device according to some examples of the present disclosure.

FIG. 5 illustrates a block diagram of an example memory device 510 according to some examples of the present disclosure. Memory device 510 may be one example of memory device 110. Memory controller 515 may be an example of memory controller 115. Similarly, memory cell array 545 may be NAND memory cells managed by the memory controller 515. Memory cell array 545 may be organized as 2D NAND arrays, 3D NAND arrays (such as 3D NAND), and the like. For example, memory cell array 545 may be organized as shown in FIG. 2, 3, and/or as shown for memory array 402 of FIG. 4. Memory cell array 545 may comprise system storage for storing a firmware object 550. Memory cell array 545 may also store user data. Thus, memory cell array 545 may be general memory cells used for user storage or may be specialized cells used for storage of firmware object 550.

Memory device 510 may include one or more electrically programmable elements 535. The electrically programmable elements 535 may provide one or more electrical signals 595 to the processor 555 that specify one or more values for one or more respective firmware search parameters. Electrically programmable elements 535 may be part of the memory controller 515 or may be external to the memory controller 515. For example, an input signal to the electrically programmable elements may be modified by the configuration of the electrically programmable elements 535. The electrically programmable elements 535 may be reconfigured using one or more electrical pulses applied to one or more of the electrically programmable elements (e.g., during manufacturing). For example, the electrically programmable elements 535 may comprise one or more fuses, antifuses, and/or efuses that change the output of the electrically programmable elements 535, and thus change the value of the signals 595 based upon whether a voltage or current above a specific threshold was applied to a particular fuse, antifuse, and/or efuse.

Signals 595 are applied as inputs to processor 555 and specify one or more values for one or more firmware search parameters. Upon initial power on or reset of the memory device 510, the processor 555 may be configured to access an instruction at a hardcoded address in a Read Only Memory (ROM) 575 of an operating memory 570 of the memory controller 515. Bootloader object 580, comprising executable instructions, may be placed at this address. The bootloader object 580 comprises one or more instructions, which when executed by the processor 555 causes the processor to perform operations as described herein. The bootloader object 580 reads the signals 595 from the electrically programmable elements 535. Signals may be direct inputs to the processor 555 or may be accessible to the processor 555 using a bus or other interconnect (which may involve other components). Signals 595 may specify one or more values for one or more firmware search parameters that are used by the bootloader object 580 to search for a valid firmware image (such as firmware image 550) in memory cell array 545. In some examples, the electrically programmable elements 535 may be on a same semiconductor package as the memory controller 515 and may be reconfigured using one or more input lines to the memory controller.

Operating memory 570 may include Random Access Memory (RAM) and Read Only Memory (ROM). Operating memory 570 may store instructions, data structures, operating storage, and other storage used by processor 555 in executing the bootloader object 580 and firmware object 550.

Since the memory controller 515 may be used in a variety of different memory devices, the location of firmware object 550 in memory cell array 545 may be different in different memory devices. Additionally, as previously noted, some memory cells in memory cell array 545 may be defective, which may cause firmware object 550 to be placed in a different location.

Firmware search parameters may include an offset from a first search location hard-coded into the bootloader. In some examples, the offset parameter may specify an offset of 0, 2, 4, or 8 pages from the default location in the memory cell array 545. This may be used where certain memory cells in the memory cell array 545 have manufacturing defects that preclude them from being used to store a firmware object—thus necessitating putting the firmware object at an offset to the default location. This allows for increased yields and decreased waste as NAND memory chips that previously were not useable due to defects in the location necessary to store the firmware (while still having enough memory cells to meet the desired capacity).

Firmware search parameters may include a step size selection. If a valid firmware object is not found in the first location, the bootloader increments the physical address by the step size and looks in this new location. In some examples, the step size is selectable between 2048 and 4096 (pages).

Firmware search parameters may include a number of locations to try. The number of locations to try may be selected by two electrically programmable elements 535 allowing for a selection of 2, 4, 8, or 16 locations (e.g., 00 maps to 2 locations, 01 maps to 4 locations, 10 maps to 8, and 11 maps to 16 locations). Thus, the bootloader looks first in the start location and then, if a valid firmware image is not found in the start location, adds an offset equal to step size and looks there. This continues a number of times specified by the value of the number of locations to try firmware search parameter. In an example, if the parameter is set to a value selecting 16 times, the bootloader looks in 16 different location with each location being an "offset" distance from the previous location.

Firmware search parameters may also include read-retry options that specify options on how to retry reading for firmware at a particular location. For example, when the controller reads the location in NAND looking for the firmware object, the read may fail. Failures may be caused by Uncorrectable Error Correction Codes (UECC), checksum mismatches, and the like. For example, a first option may select the number of times to retry reading the firmware at a particular location. A second firmware search option may specify a first read retry voltage to try and a third firmware search option may specify a voltage step. Thus, the first read retry uses the first read retry voltage and the second read retry adds the voltage step to the first read retry voltage, and so on until the firmware is successfully read or until the number of read retries have been attempted. Once the bootloader has attempted the specified number of read-retries without obtaining a valid firmware, the memory device moves on to a next location or gives up, depending if the maximum number of locations to try has been exceeded.

If the bootloader object 580 finds the firmware object 550, the bootloader may cause the processor to load the firmware object 550, or a part of the firmware object 550, into Random Access Memory (RAM) 590. The bootloader object 580 may finish executing and cause the processor to begin executing the firmware object 550. Firmware object 550 includes instructions, which when executed by processor 555, causes the processor 555 to perform certain operations. For example, the firmware may be responsible for implementing software for host interfaces, host command processing, memory management, and the like.

Figure 6:
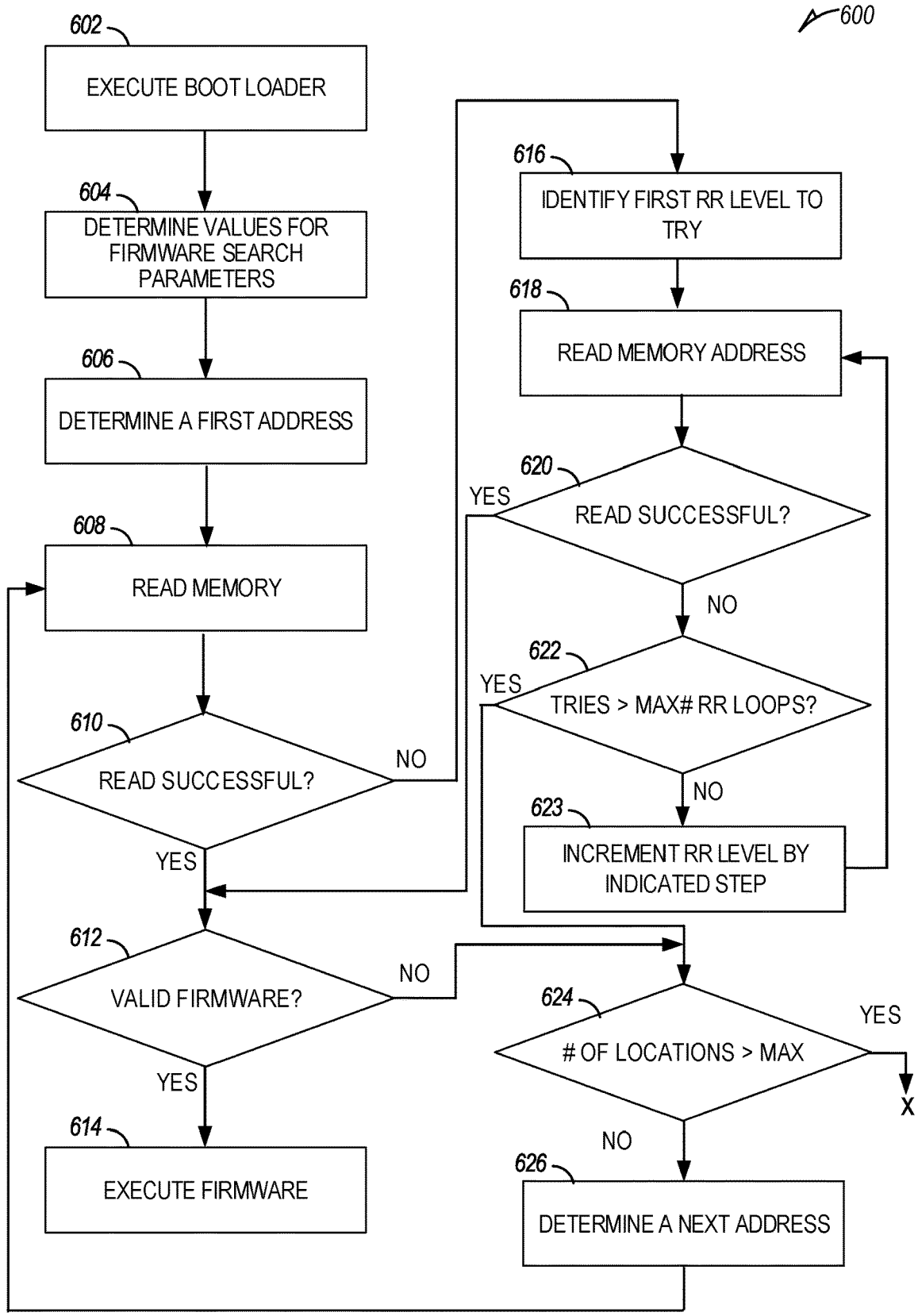
FIG. 6 illustrates a flowchart of a method performed by a processor of a memory device to search for a firmware object according to some examples of the present disclosure.

FIG. 6 illustrates a flowchart of a method 600 performed by a processor of a memory device to search for a firmware object 550 according to some examples of the present disclosure. Once power is applied to the memory device, at operation 602 the processor executes an instruction at a default address in working memory. This instruction may be part of the bootloader and thus, the bootloader begins execution.

At operation 604 the bootloader may then determine values for the firmware search parameters. For example, by reading the input signals from the electrically programmable elements 535. As noted, the electrically programmable elements 535 may be fuses, anti-fuses, e-fuses, and/or the like. One or more of the fuses, anti-fuses, and/or e-fuses may be blown during manufacturing (either automatically or manually) to provide the firmware configuration parameters to the bootloader. In some examples, the bootloader may convert the signals from the electrically programmable elements into values for the various parameters (e.g., the signal may be 11 may indicate to search 16 different memory locations) according to a conversion that is programmed into the boot loader.

At operation 606 the bootloader may determine a first location to look in memory based upon the values of the firmware search parameters. For example, the bootloader may have a default memory location (e.g., memory address) programmed into the ROM (e.g., in the instructions). The memory address may point to one or more memory cells of the memory device. The values of the firmware search parameters may specify an offset which may be 2 bits that specifies 0, 2, 4, or 8 page offset from the default location. The firmware object can be moved to a different location and the offset bits may be set (e.g., the fuses may be blown) to indicate the offset location. Thus, in one example, the first location may be a default location offset by any offset location specified in the firmware search parameters.

At operation 608 the first location may be read. If at operation 610 the memory is read successfully—e.g., there are no uncorrectable error correction code (ECC) errors, then at operation 612, the firmware image is checked. For example, one or more of: a hash value, parity value, digital certificate, firmware version, or the like is compared to an expected value or otherwise validated, or the like. If the firmware is not valid (e.g., it fails this check), then flow proceeds to operation 624. If the firmware is valid, then at operation 614 the firmware is loaded into RAM and executed. The firmware may be executed either immediately, or after further processing and/or cleanup by the bootloader.

If at operation 610, the read is not successful (e.g., uncorrectable ECC errors), then a read retry loop (comprising operations 616, 618, 620, 622, and 623) begins. At operation 616 the bootloader determines the first read retry level (e.g. voltage level) to try. For example, a default voltage level. In other examples, the firmware search parameters may have values for read retry parameters, such as an option to select the first read-retry level. At operation 618, the first read-retry is attempted.

If the read was determined successful at operation 620, the bootloader determines whether the read was of a valid firmware at operation 612 and if so, then at operation 614, the firmware is executed. If the firmware is not valid, then flow proceeds to operation 624.

If the read was not successful (e.g., an uncorrectable ECC) at operation 620, the bootloader then determines if the number of read retries attempted exceeds a maximum number of read retry loops at operation 622. The maximum number of read retry loops may be a configurable value in the firmware search parameters set by the electrically programmable elements. If the number of read retries already attempted is greater than the maximum, then flow proceeds to operation 624.

If the number of tries is less than the maximum number of read retry loops then at operation 623 the read retry level may be incremented by a read retry step. In some examples, the read retry step may be a value specified in the firmware search parameters set by the electrically programmable elements. Flow proceeds to operation 618 where the incremented read retry level (e.g., voltage level) determined at operation 623 is used to read the memory address.

If a valid firmware is not found at operation 612 (but the memory was read properly), or the maximum number of read retries has been attempted without success, then at operation 624 a check is made to determine whether the number of addresses tried is greater than a maximum number of addresses. The maximum number of addresses to try may be specified as a value in firmware search parameters set by the electrically programmable elements. If the number of locations tried exceeds the threshold, then operations terminate and the bootloader has not found a firmware image. If the number of locations tried is less than the maximum number of locations, then at operation 626 a next address is determined. For example, the current address is offset by a firmware search step size parameter. The firmware search step size may be specified as a value in the firmware search parameters set by the electrically programmable elements. Flow then proceeds to operation 608.

Figure 7:
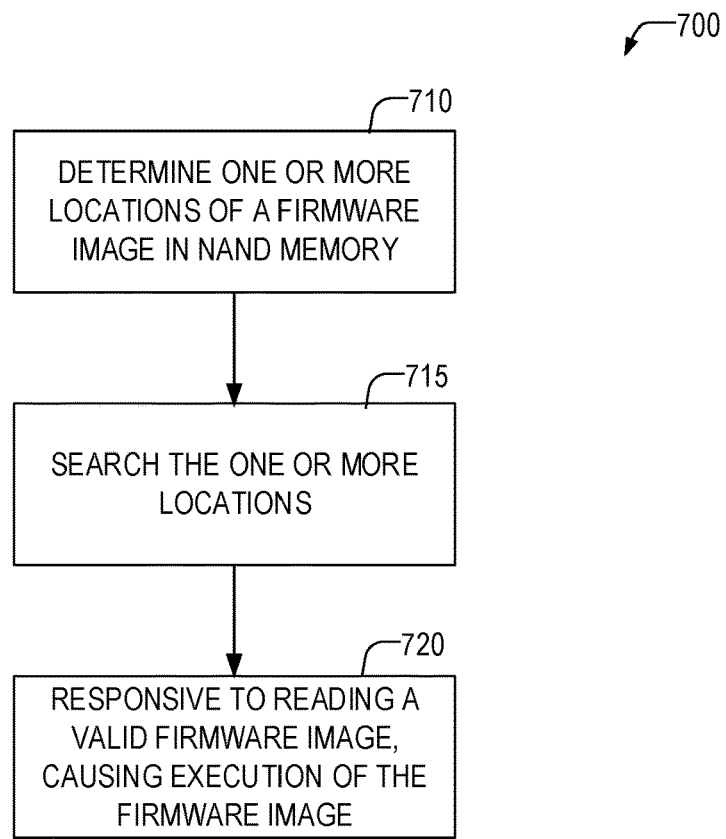
FIG. 7 illustrates a flowchart of a method of loading a firmware object according to some examples of the present disclosure.

FIG. 7 illustrates a flowchart of a method 700 of loading a firmware object according to some examples of the present disclosure. FIG. 7 is a simplified version of FIG. 6. At operation 710 a processor of the controller may determine one or more locations of a firmware image in NAND memory. This may be done in accordance with one or more values for one or more first firmware search parameters, the one or more values indicated by a first set of the electrically programmable elements. For example, the controller may read one or more signals from one or more of a first set of electrically programmable elements to determine a starting location. The starting location may be based upon a default location (e.g., a location programmed into the bootloader) and an offset (determined based upon one or more signals from one or more of a first set of electrically programmable elements). Other locations may be determined if the firmware object is not located at the first location. The other locations may be determined based upon the current location and values of other parameters of the first firmware search parameters (e.g., a step size), the values of the other of the first firmware search parameters may be determined based upon other ones of the first set of electrically programmable elements. In some examples, each of the values of one or more firmware search parameters may be specified by one or more electrically programmable elements and each electrically programmable element may specify a value for one, a portion of one, multiple ones, or a portion of multiple ones of firmware search parameters. In some examples, other firmware search parameters may include one or more electrically programmable elements that specify a bit-mask to skip some locations in a sequence of locations obtained by start, stop and step options.

At operation 715 the locations may be searched—e.g., the first location, then a second location, and the like until a valid firmware image is found or until the bootloader has tried the maximum number of locations specified by a value of one of the firmware search parameters. As part of the searching, the controller may read the NAND memory and if necessary, perform one or more read-retry procedures. The read-retry procedures may be done in accordance with one or more values for one or more second firmware search parameters, the one or more values indicated by a second set of the electrically programmable elements. In some examples, the first and second firmware search parameters and the first and second set of electrically programmable elements may be different. At operation 720, if a valid firmware image is found, the bootloader may cause the execution of a valid firmware image. In some examples, this can be accomplished by the bootloader loading the firmware into RAM and causing a current instruction pointer of a processor of the controller to jump to the location of the firmware in the RAM.

Figure 8:
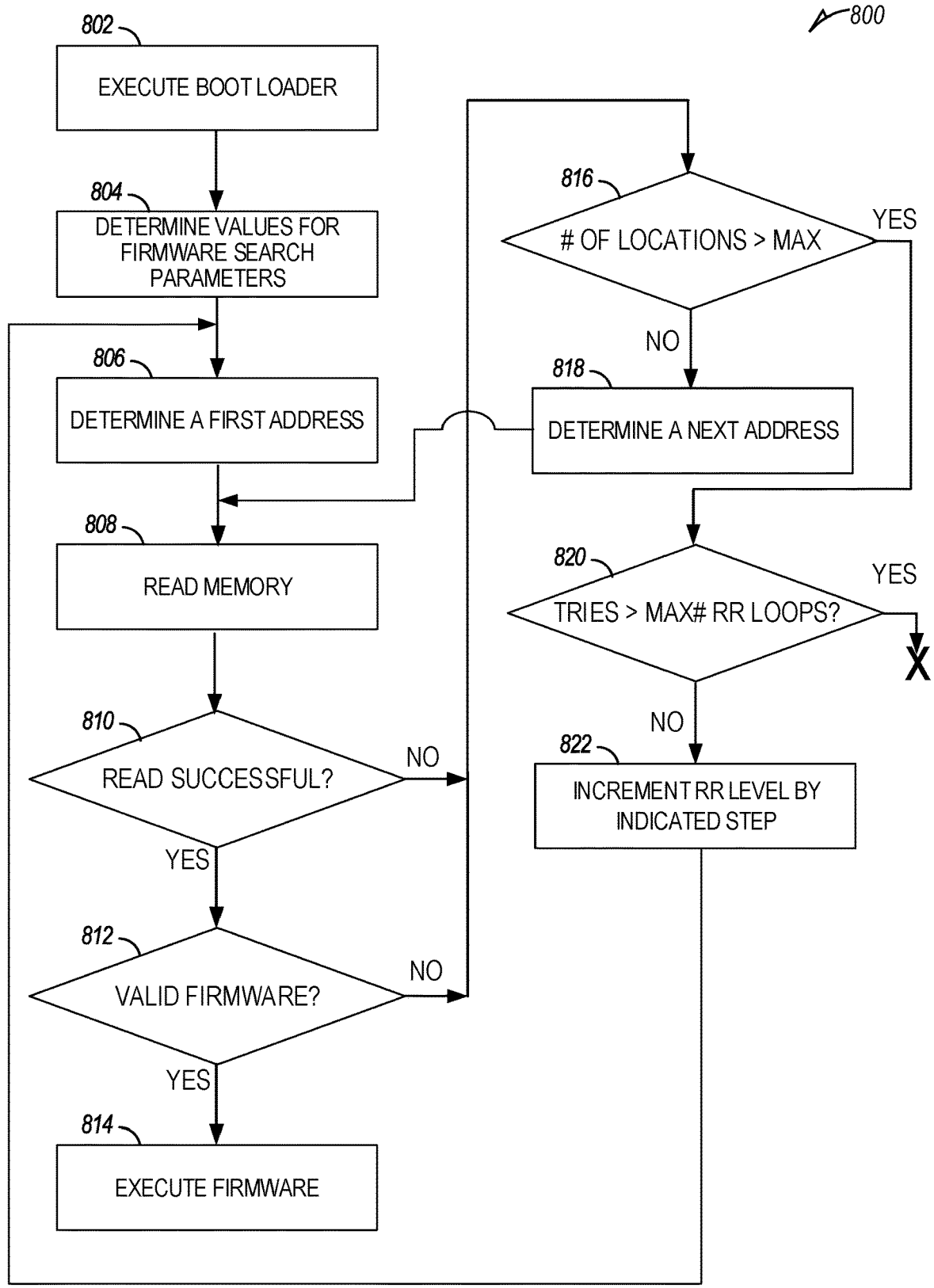
FIG. 8 illustrates a flowchart of a method performed by a processor of a memory device to search for a firmware object according to some examples of the present disclosure.

FIG. 8 illustrates a flowchart of a method 800 performed by a processor of a memory device to search for a firmware object 550 according to some examples of the present disclosure. The flowchart of FIG. 8 tries all the locations before increasing a read retry level in a read retry procedure. This differs from the method 600 where the read-retry procedure was completed for a particular location before moving on to the next location.

Once power is applied to the memory device, at operation 802 the processor executes an instruction at a default address in working memory. This instruction may be part of the bootloader and thus, the bootloader begins execution. At operation 804 the bootloader may then determine values for the firmware search parameters. For example, by reading the input signals from the electrically programmable elements 535. As noted, the electrically programmable elements 535 may be fuses, anti-fuses, e-fuses, and/or the like. One or more of the fuses, anti-fuses, and/or e-fuses may be blown during manufacturing (either automatically or manually) to provide the firmware configuration parameters to the bootloader. In some examples, the bootloader may convert the signals from the electrically programmable elements into values for the various parameters (e.g., the signal may be 11 may indicate to search 16 different memory locations) according to a conversion that is programmed into the boot loader.

At operation 806 the bootloader may determine a first location to look in memory based upon the values of the firmware search parameters. For example, the bootloader may have a default memory location (e.g., memory address) programmed into the ROM (e.g., in the instructions). The memory address may point to one or more memory cells of the memory device. The values of the firmware search parameters may specify an offset which may be 2 bits that specifies 0, 2, 4, or 8 page offset from the default location. The firmware object can be moved to a different location and the offset bits may be set (e.g., the fuses may be blown) to indicate the offset location. Thus, in one example, the first location may be a default location offset by any offset location specified in the firmware search parameters.

At operation 808 the first location may be read. If at operation 810 the memory is read successfully—e.g., there are no uncorrectable error correction code (ECC) errors, then at operation 812, the firmware image is checked. For example, one or more of: a hash value, parity value, digital certificate, firmware version, or the like is compared to an expected value or otherwise validated, or the like. If the firmware is valid, then at operation 814 the firmware is loaded into RAM and executed. The firmware may be executed either immediately, or after further processing and/or cleanup by the bootloader.

If the firmware is not valid (e.g., it fails this check), or the read was not successful at operation 810 then flow proceeds to operation 816. At operation 816 the bootloader determines whether all the locations have been checked. If not, then at operation 818, the bootloader determines a next address to check based upon the firmware search parameters. For example, an offset value specified by the firmware search parameters is added to a current location. Flow then proceeds to operation 808 where the new memory location is read, a check is made at operations 810 and 812 to determine if a valid firmware image is found and if so, then at operation 814 the firmware is executed.

New locations are read and checked until either a valid firmware object is executed at operation 814 or until the number of locations to try has been exhausted at operation 816. When the number of locations to try has been exhausted, the locations system may determine whether the number of times the system has tried each location exceeds a maximum number of read retry loops at operation 820. If the answer is yes, then processing terminates. If the number of times the system has tried each location does not exceed the maximum number of read retry loops at operation 820, then at operation 822, the system may increment the read retry level indicated by the value of the read retry step in the firmware search parameters. The system then tries all the locations again at the increased read retry level. The read retry level is incremented each time all locations are tried until either a valid image is found or until the number of read retry loops is exhausted at operation 820.

Figure 9:
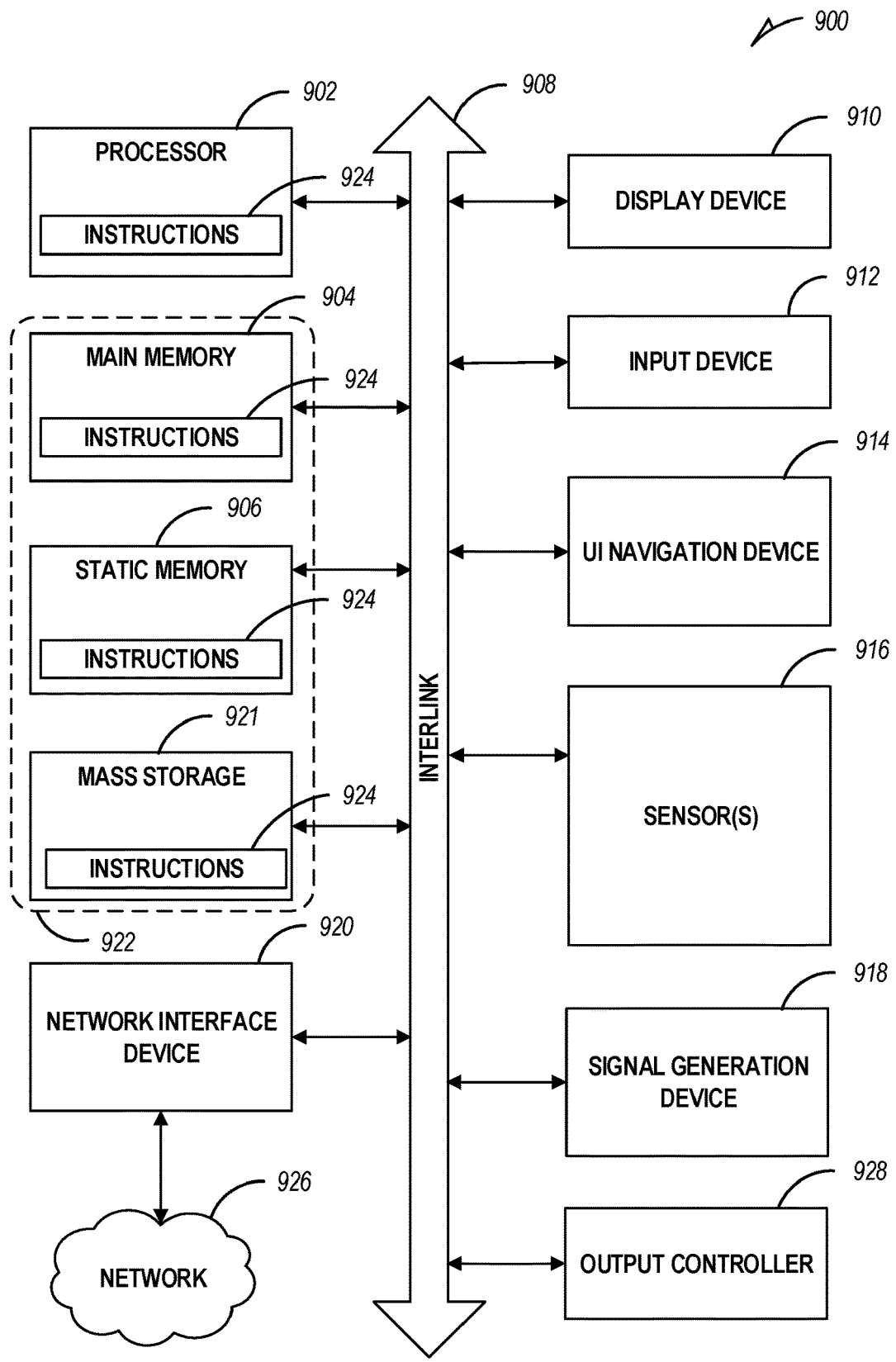
FIG. 9 is a block diagram illustrating an example of a machine upon which one or more embodiments can be implemented.

FIG. 9 illustrates a block diagram of an example machine 900 upon which any one or more of the techniques (e.g., methodologies) discussed herein can perform. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, an IoT device, automotive system, a host device, or any machine capable of executing instructions (sequential or otherwise) that specify actions to be taken by that machine. Components of machine 1000 can be present in a memory device (e.g., a processor, main memory, mass storage and the like). Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 900 (e.g., the host device 105, the memory device 110, etc.) can include a hardware processor 902 (e.g., a central processing unit (CPU), a graphics processing unit (GPU), a hardware processor core, or any combination thereof, such as the memory controller 115, etc.), a main memory 904 and a static memory 906, some or all of which can communicate with each other via an interlink (e.g., bus) 908. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 921, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine readable medium 922 may include a storage device 821 on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 921 can constitute the machine readable medium 922.

While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium capable of storing, encoding, or carrying instructions for execution by the machine 900 and that cause the machine 900 to perform any one or more of the techniques of the present disclosure, or capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data are stored on the storage device 921, can be accessed by the memory 904 for use by the processor 902. The memory 904 (e.g., DRAM) is typically fast, but volatile, and thus a different type of storage than the storage device 921 (e.g., an SSD), which is suitable for long-term storage, including while in an "off" condition. The instructions 924 or data in use by a user or the machine 900 are typically loaded in the memory 904 for use by the processor 902. When the memory 904 is full, virtual space from the storage device 921 can be allocated to supplement the memory 904; however, because the storage device 921 is typically slower than the memory 904, and write speeds are typically at least twice as slow as read speeds, use of virtual memory can greatly reduce user experience due to storage device latency (in contrast to the memory 904, e.g., DRAM). Further, use of the storage device 921 for virtual memory can greatly reduce the usable lifespan of the storage device 921.

In contrast to virtual memory, virtual memory compression (e.g., the Linux® kernel feature "ZRAM") uses part of the memory as compressed block storage to avoid paging to the storage device 921. Paging takes place in the compressed block until it is necessary to write such data to the storage device 921. Virtual memory compression increases the usable size of memory 904, while reducing wear on the storage device 921.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

OTHER NOTES AND EXAMPLES

Example 1 is a memory device, comprising: a first set of one or more electrically programmable elements indicating values for one or more first firmware search parameters; a second set of one or more electrically programmable elements indicating values for one or more second firmware search parameters; and a processor configured to perform operations comprising: determining one or more potential locations of a firmware image in memory cells of the memory device in accordance with the values for the one or more first firmware search parameters indicated by the first set of one or more electrically programmable elements; searching the one or more potential locations for a valid firmware image by reading the memory cells at the one or more potential locations in accordance with the values for the one or more second firmware search parameters indicated by the second set of one or more electrically programmable elements; and responsive to reading a valid firmware image, causing execution of the firmware image.

In Example 2, the subject matter of Example 1 includes, wherein the first and second sets of one or more electrically programmable elements includes one of: a fuse, an anti-fuse, an e-fuse.

In Example 3, the subject matter of Examples 1-2 includes, wherein one of the first firmware search parameters is a firmware search step size, wherein the firmware search step size specifies an offset between potential locations of the firmware image.

In Example 4, the subject matter of Examples 1-3 includes, wherein one of the first firmware search parameters is a number of potential locations to try.

In Example 5, the subject matter of Examples 1-4 includes, wherein one of the first firmware search parameters is an offset to a default potential location.

In Example 6, the subject matter of Examples 1-5 includes, wherein one of the second firmware search parameters is a number of read retry loops specifying a number of times to try to search each of the one or more potential locations.

In Example 7, the subject matter of Examples 1-6 includes, wherein one of the second firmware search parameters is a first read retry to try.

In Example 8, the subject matter of Examples 1-7 includes, wherein one of the second firmware search parameters is a read retry step.

In Example 9, the subject matter of Examples 1-8 includes, wherein the operations of determining one or more potential locations of a firmware image in memory cells comprises determining a first potential location using a default location and a value for a first one of the first firmware search parameters that specifies an initial offset.

In Example 10, the subject matter of Example 9 includes, wherein the operations of determining one or more potential locations of a firmware image in memory cells comprises determining a second potential location based upon the first potential location and a value of a second one of the first firmware search parameters that specifies a firmware search step size.

In Example 11, the subject matter of Examples 1-10 includes, wherein the first and second sets of one or more electrically programmable elements and the processor are part of a controller.

In Example 12, the subject matter of Examples 1-11 includes, wherein the processor is part of the controller, and the first and second sets of one or more electrically programmable elements are separate from the controller.

In Example 13, the subject matter of Examples 1-12 includes, wherein the memory cells are NAND memory cells.

Example 14 is a machine readable medium, comprising instructions, which when executed by a processor of a memory device, cause the processor to perform operations comprising: determining one or more potential locations of a firmware image in memory cells of the memory device in accordance with values for one or more first firmware search parameters indicated by a first set of one or more electrically programmable elements; searching the one or more potential locations for a valid firmware image by reading the memory cells at one or more potential locations in accordance with values for one or more second firmware search parameters indicated by a second set of one or more electrically programmable elements; and responsive to reading a valid firmware image, causing execution of the firmware image.

In Example 15, the subject matter of Example 14 includes, wherein the first and second sets of one or more electrically programmable elements includes one of: a fuse, an anti-fuse, an e-fuse.

In Example 16, the subject matter of Examples 14-15 includes, wherein one of the first firmware search parameters is a firmware search step size, wherein the firmware search step size specifies an offset between potential locations of the firmware image.

In Example 17, the subject matter of Examples 14-16 includes, wherein one of the first firmware search parameters is a number of potential locations to try.

In Example 18, the subject matter of Examples 14-17 includes, wherein one of the first firmware search parameters is an offset to a default potential location.

In Example 19, the subject matter of Examples 14-18 includes, wherein one of the second firmware search parameters is a number of read retry loops specifying a number of times to try to search each of the one or more potential locations.

In Example 20, the subject matter of Examples 14-19 includes, wherein one of the second firmware search parameters is a first read retry to try.

In Example 21, the subject matter of Examples 14-20 includes, wherein one of the second firmware search parameters is a read retry step.

In Example 22, the subject matter of Examples 14-21 includes, wherein the operations of determining one or more potential locations of a firmware image in memory cells comprises determining a first potential location using a default location and a value for a first one of the first firmware search parameters that specifies an initial offset.

In Example 23, the subject matter of Example 22 includes, wherein the operations of determining one or more potential locations of a firmware image in memory cells comprises determining a second potential location based upon the first potential location and a value of a second one of the first firmware search parameters that specifies a firmware search step size.

In Example 24, the subject matter of Examples 14-23 includes, wherein the first and second sets of one or more electrically programmable elements and the processor are part of a controller.

In Example 25, the subject matter of Examples 14-24 includes, wherein the processor is part of the controller, and the first and second sets of one or more electrically programmable elements are separate from the controller.

In Example 26, the subject matter of Examples 14-25 includes, wherein the memory cells are NAND memory cells.

Example 27 is a method performed by a NAND controller, the method comprising: determining one or more potential locations of a firmware image in memory cells of the memory device in accordance with values for one or more first firmware search parameters indicated by a first set of one or more electrically programmable elements; searching the one or more potential locations for a valid firmware image by reading the memory cells at one or more potential locations in accordance with values for one or more second firmware search parameters indicated by a second set of one or more electrically programmable elements; and responsive to reading a valid firmware image, causing execution of the firmware image.

In Example 28, the subject matter of Example 27 includes, wherein the first and second sets of one or more electrically programmable elements includes one of: a fuse, an anti-fuse, an e-fuse.

In Example 29, the subject matter of Examples 27-28 includes, wherein one of the first firmware search parameters is a firmware search step size, wherein the firmware search step size specifies an offset between potential locations of the firmware image.

In Example 30, the subject matter of Examples 27-29 includes, wherein one of the first firmware search parameters is a number of potential locations to try.

In Example 31, the subject matter of Examples 27-30 includes, wherein one of the first firmware search parameters is an offset to a default potential location.

In Example 32, the subject matter of Examples 27-31 includes, wherein one of the second firmware search parameters is a number of read retry loops specifying a number of times to try to search each of the one or more potential locations.

In Example 33, the subject matter of Examples 27-32 includes, wherein one of the second firmware search parameters is a first read retry to try.

In Example 34, the subject matter of Examples 27-33 includes, wherein one of the second firmware search parameters is a read retry step.

In Example 35, the subject matter of Examples 27-34 includes, wherein determining one or more potential locations of a firmware image in memory cells comprises determining a first potential location using a default location and a value for a first one of the first firmware search parameters that specifies an initial offset.

In Example 36, the subject matter of Example 35 includes, wherein determining one or more potential locations of a firmware image in memory cells comprises determining a second potential location based upon the first potential location and a value of a second one of the first firmware search parameters that specifies a firmware search step size.

In Example 37, the subject matter of Examples 27-36 includes, wherein the first and second sets of one or more electrically programmable elements and the processor are part of a controller.

In Example 38, the subject matter of Examples 27-37 includes, wherein the processor is part of the controller, and the first and second sets of one or more electrically programmable elements are separate from the controller.

In Example 39, the subject matter of Examples 27-38 includes, wherein the memory cells are NAND memory cells.

Example 40 is a memory device comprising: means for determining one or more potential locations of a firmware image in memory cells of the memory device in accordance with values for one or more first firmware search parameters indicated by a first set of one or more electrically programmable elements; means for searching the one or more potential locations for a valid firmware image by reading the memory cells at one or more potential locations in accordance with values for one or more second firmware search parameters indicated by a second set of one or more electrically programmable elements; and responsive to reading a valid firmware image, means for causing execution of the firmware image.

In Example 41, the subject matter of Example 40 includes, wherein the first and second sets of one or more electrically programmable elements includes one of: a fuse, an anti-fuse, an e-fuse.

In Example 42, the subject matter of Examples 40-41 includes, wherein one of the first firmware search parameters is a firmware search step size, wherein the firmware search step size specifies an offset between potential locations of the firmware image.

In Example 43, the subject matter of Examples 40-42 includes, wherein one of the first firmware search parameters is a number of potential locations to try.

In Example 44, the subject matter of Examples 40-43 includes, wherein one of the first firmware search parameters is an offset to a default potential location.

In Example 45, the subject matter of Examples 40-44 includes, wherein one of the second firmware search parameters is a number of read retry loops specifying a number of times to try to search each of the one or more potential locations.

In Example 46, the subject matter of Examples 40-45 includes, wherein one of the second firmware search parameters is a first read retry to try.

In Example 47, the subject matter of Examples 40-46 includes, wherein one of the second firmware search parameters is a read retry step.

In Example 48, the subject matter of Examples 40-47 includes, wherein the means for determining one or more potential locations of a firmware image in memory cells comprises means for determining a first potential location using a default location and a value for a first one of the first firmware search parameters that specifies an initial offset.

In Example 49, the subject matter of Example 48 includes, wherein the means for determining one or more potential locations of a firmware image in memory cells comprises means for determining a second potential location based upon the first potential location and a value of a second one of the first firmware search parameters that specifies a firmware search step size.

In Example 50, the subject matter of Examples 48-49 includes, wherein the first and second sets of one or more electrically programmable elements and the processor are part of a controller.

In Example 51, the subject matter of Examples 48-50 includes, wherein the processor is part of the controller, and the first and second sets of one or more electrically programmable elements are separate from the controller.

In Example 52, the subject matter of Examples 48-51 includes, wherein the memory cells are NAND memory cells.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The invention claimed is:

1. A memory device, comprising:
a first set of one or more electrically programmable elements indicating values for one or more firmware search parameters;
a second set of one or more electrically programmable elements indicating values for one or more firmware read parameters, the respective programmable elements of the first and second sets of one or more electrically programmable elements being a fuse, anti-fuse, or an e-fuse; and
a processor configured to perform operations comprising:
reading signals from the first set and the second set of one or more programmable elements;
interpreting the signal from the first set of one or more electrically programmable elements to determine values for the one or more firmware search parameters;
interpreting the signal from the second set of one or more electrically programmable elements to determine values for the one or more firmware read parameters, the firmware read parameters comprising a read retry voltage;
determining one or more potential locations of a firmware image in memory cells of the memory device in accordance with the values for the one or more firmware search parameters indicated by the first set of one or more electrically programmable elements, the firmware search parameters comprising an offset and a step size, a first potential location of the one or more potential locations determined by adding the offset to a base address, and subsequent locations of the one or more potential locations are determined based upon a previous location and the step size;
searching the one or more potential locations for a valid firmware image by reading the memory cells at the one or more potential locations in accordance with the values for the one or more firmware read parameters indicated by the second set of one or more electrically programmable elements;
determining that a read-error occurred when reading at least one of the one or more potential locations;
responsive to determining that the read-error occurred when reading the at least one of the one or more potential locations, re-reading the at least one of the one or more potential locations utilizing a read voltage based upon the read retry voltage;
upon finding a valid firmware image, validating the firmware image; and
responsive to reading a valid firmware image, causing execution of the firmware image.

2. The memory device of claim 1, wherein one of the firmware search parameters is a number of potential locations to try.

3. The memory device of claim 1, wherein one of the firmware read parameters is a number of read retry loops specifying a number of times to try to search each of the one or more potential locations.

4. The memory device of claim 1, wherein one of the firmware read parameters is a read retry step voltage.

5. The memory device of claim 1, wherein the first and second sets of one or more electrically programmable elements and the processor are part of a memory controller.

6. The memory device of claim 1, wherein the processor is part of a memory controller, and the first and second sets of one or more electrically programmable elements are separate from the memory controller.

7. The memory device of claim 1, wherein the memory cells are NAND memory cells.

8. A non-transitory machine readable medium, comprising instructions, which when executed by a processor of a memory device, cause the processor to perform operations comprising:
reading signals from a first set and a second set of one or more programmable elements;
interpreting the signal from the first set of one or more electrically programmable elements to determine values for one or more firmware search parameters;

interpreting the signal from the second set of one or more electrically programmable elements to determine values for one or more firmware read parameters, the firmware read parameters comprising a read retry voltage;

determining one or more potential locations of a firmware image in memory cells of the memory device in accordance with values for one or more firmware search parameters indicated by a first set of one or more electrically programmable elements, the firmware search parameters comprising an offset and a step size, a first potential location of the one or more potential locations determined by adding the offset to a base address, and subsequent locations of the one or more potential locations are determined based upon a previous location and the step size;

searching the one or more potential locations for a valid firmware image by reading the memory cells at one or more potential locations in accordance with values for one or more firmware read parameters indicated by a second set of one or more electrically programmable elements, the first and second sets of one or more electrically programmable elements being a fuse, anti-fuse, or an e-fuse, the firmware read parameters comprising a read-retry voltage;

determining that a read-error occurred when reading at least one of the one or more potential locations;

responsive to determining that the read-error occurred when reading the at least one of the one or more potential locations, re-reading the at least one of the one or more potential locations utilizing a read voltage based upon the read retry voltage;

upon finding a valid firmware image, validating the firmware image; and responsive to reading a valid firmware image, causing execution of the firmware image.

9. The non-transitory machine readable medium of claim 8 wherein one of the firmware search parameters is a number of potential locations to try.

10. The non-transitory machine readable medium of claim 8, wherein one of the firmware read parameters is a number of read retry loops specifying a number of times to try to search each of the one or more potential locations.

11. The non-transitory machine readable medium of claim 8, wherein one of the firmware read parameters is a read retry step voltage.

12. The non-transitory machine readable medium of claim 8, wherein the first and second sets of one or more electrically programmable elements and the processor are part of a memory controller.

13. The non-transitory machine readable medium of claim 8, wherein the processor is part of a memory controller, and the first and second sets of one or more electrically programmable elements are separate from the memory controller.

14. The non-transitory machine readable medium of claim 8, wherein the memory cells are NAND memory cells.

15. A method performed by a NAND controller, the method comprising:

reading signals from a first set and a second set of one or more programmable elements;

interpreting the signal from the first set of one or more electrically programmable elements to determine values for one or more firmware search parameters;

interpreting the signal from the second set of one or more electrically programmable elements to determine values for one or more firmware read parameters, the firmware read parameters comprising a read retry voltage;

determining one or more potential locations of a firmware image in memory cells of a memory device in accordance with values for one or more first firmware search parameters indicated by a first set of one or more electrically programmable elements, the firmware search parameters comprising an offset and a step size, a first potential location of the one or more potential locations determined by adding the offset to a base address, and subsequent locations of the one or more potential locations are determined based upon a previous location and the step size;

searching the one or more potential locations for a valid firmware image by reading the memory cells at one or more potential locations in accordance with values for one or more firmware read parameters indicated by a second set of one or more electrically programmable elements, the first and second sets of one or more electrically programmable elements being a fuse, anti-fuse, or an e-fuse, the firmware read parameters comprising a read-retry voltage;

determining that a read-error occurred when reading at least one of the one or more potential locations;

responsive to determining that the read-error occurred when reading the at least one of the one or more potential locations, re-reading the at least one of the one or more potential locations utilizing a read voltage based upon the read retry voltage;

upon finding a valid firmware image, validating the firmware image; and responsive to reading a valid firmware image, causing execution of the firmware image.

16. The method of claim 15, wherein one of the first firmware search parameters is a number of potential locations to try.

17. The method of claim 15, wherein one of the firmware read parameters is a number of read retry loops specifying a number of times to try to search each of the one or more potential locations.

18. The method of claim 15, wherein one of the firmware read parameters is a read retry step voltage.

19. The method of claim 15, wherein the first and second sets of one or more electrically programmable elements are part of the NAND controller.

20. The method of claim 15, wherein the first and second sets of one or more electrically programmable elements are separate from the NAND controller.

* * * * *